(12) United States Patent
Suzuki et al.

(10) Patent No.: US 8,347,128 B2
(45) Date of Patent: Jan. 1, 2013

(54) DATA PROCESSING DEVICE AND POWER CONTROL METHOD

(75) Inventors: Yousuke Suzuki, Osaka (JP); Takahiro Nagai, Osaka (JP); Takashi Yano, Osaka (JP)

(73) Assignee: Panasonic Corporation, Osaka (JP)

( * ) Notice: Subject to any disclaimer, the term of this patent is extended or adjusted under 35 U.S.C. 154(b) by 436 days.

(21) Appl. No.: 12/529,225

(22) PCT Filed: Feb. 28, 2008

(86) PCT No.: PCT/JP2008/000379
§ 371 (c)(1),
(2), (4) Date: Aug. 31, 2009

(87) PCT Pub. No.: WO2008/108070
PCT Pub. Date: Sep. 12, 2008

(65) Prior Publication Data
US 2010/0115318 A1 May 6, 2010

(30) Foreign Application Priority Data
Mar. 1, 2007 (JP) .................................. 2007-050992

(51) Int. Cl.
*G06F 1/00* (2006.01)
(52) U.S. Cl. ........ 713/310; 713/300; 713/320; 713/323; 713/324; 386/200; 386/211; 386/212; 386/213; 386/214; 386/216; 386/217; 386/218; 386/219; 386/220; 386/323
(58) Field of Classification Search .................. 713/300, 713/310, 320, 323, 324; 386/200, 211–214, 386/216–220, 323
See application file for complete search history.

(56) References Cited

U.S. PATENT DOCUMENTS

| 7,437,577 | B2 * | 10/2008 | Obara et al. | 713/300 |
|---|---|---|---|---|
| 7,447,918 | B2 * | 11/2008 | Dunstan et al. | 713/300 |
| 7,552,347 | B2 * | 6/2009 | Schutte | 713/300 |
| 7,698,584 | B2 * | 4/2010 | Dunstan et al. | 713/300 |
| 2004/0078610 | A1 | 4/2004 | Naitoh | |

(Continued)

FOREIGN PATENT DOCUMENTS
EP 1887579 2/2008
(Continued)

OTHER PUBLICATIONS

English language Abstract of JP 2004-349790, Dec. 9, 2004.
(Continued)

*Primary Examiner* — Jaweed A Abbaszadeh
(74) *Attorney, Agent, or Firm* — Greenblum & Bernstein, P.L.C.

(57) ABSTRACT

A data processing device connects to a first display and operates in a power state including a power-off state, a recording standby state, and a power-on state. A second display displays an operation state of the data processing device. A power controller supplies electric power to a driver in the power-on state and the recording standby state, and stops supplying the electric power in the power-off state. The second display indicates that power is ON in the power-on state, and indicates that the power is OFF in the recording standby state and the power-off state. The power controller switches the power state from the recording standby state to the power-on state when a signal instructing start of a recording operation is received from the first display and the power state is the recording standby state.

18 Claims, 7 Drawing Sheets

U.S. PATENT DOCUMENTS

| | | | |
|---|---|---|---|
| 2005/0044427 A1* | 2/2005 | Dunstan et al. | 713/300 |
| 2005/0231765 A1 | 10/2005 | So et al. | |
| 2006/0140577 A1 | 6/2006 | Ninomiya et al. | |
| 2007/0046833 A1* | 3/2007 | Kitamura | 348/730 |
| 2007/0174334 A1 | 7/2007 | Inoue et al. | |
| 2007/0201836 A1* | 8/2007 | Tsubota et al. | 386/96 |
| 2009/0041438 A1* | 2/2009 | Kuno | 386/126 |
| 2009/0116822 A1* | 5/2009 | Shimizu et al. | 386/125 |
| 2010/0141848 A1* | 6/2010 | Bastable et al. | 348/730 |

FOREIGN PATENT DOCUMENTS

| | | |
|---|---|---|
| JP | 2004-349790 | 12/2004 |
| JP | 2006-209941 | 8/2006 |
| WO | 2006/109581 | 10/2006 |

OTHER PUBLICATIONS

English language Abstract of JP 2006-209941, Aug. 10/2006.

Extended European Search Report including European Search Opinion in EP Application No. 08720293, dated Nov. 14, 2011.

HDMI Consortium, "High-Definition Multimedia Interface Specification" and "Supplement 1 Consumer Electronics Control (CEC)," HDMI Licensing, LLC, Internet Article, vol. 1, Version 1, dated May 20, 2004 (available at http://www.hdmi.org/download/HDMI_Specification_1.1.pdf).

E.P.O. Office Action in Application No. 08 720 293.3, dated Aug. 21, 2012.

"High-Definition Multimedia Interface Specification Version 1.3", Internet Citation, Jun. 22, 2006, XP002391813, URL: http://www.hdmi.org/download/HDMI_Spec_1.3_GM1.pdf [retrieved on Jul. 24, 2006].

\* cited by examiner

Fig.2

| | POWER SUPPLY TO CONTROL UNIT | OUTPUT OF THE VIDEO AND/OR AUDIO DATA | POWER SUPPLY TO DRIVE UNIT AND HDD | DISPLAY OF FRONT PANEL UNIT |
|---|---|---|---|---|
| POWER-ON STATE | YES | YES | YES | POWER-ON |
| POWER-OFF STATE | YES | NO | NO | POWER-OFF |
| RECORDING STANDBY STATE | YES | NO | YES | POWER-OFF |

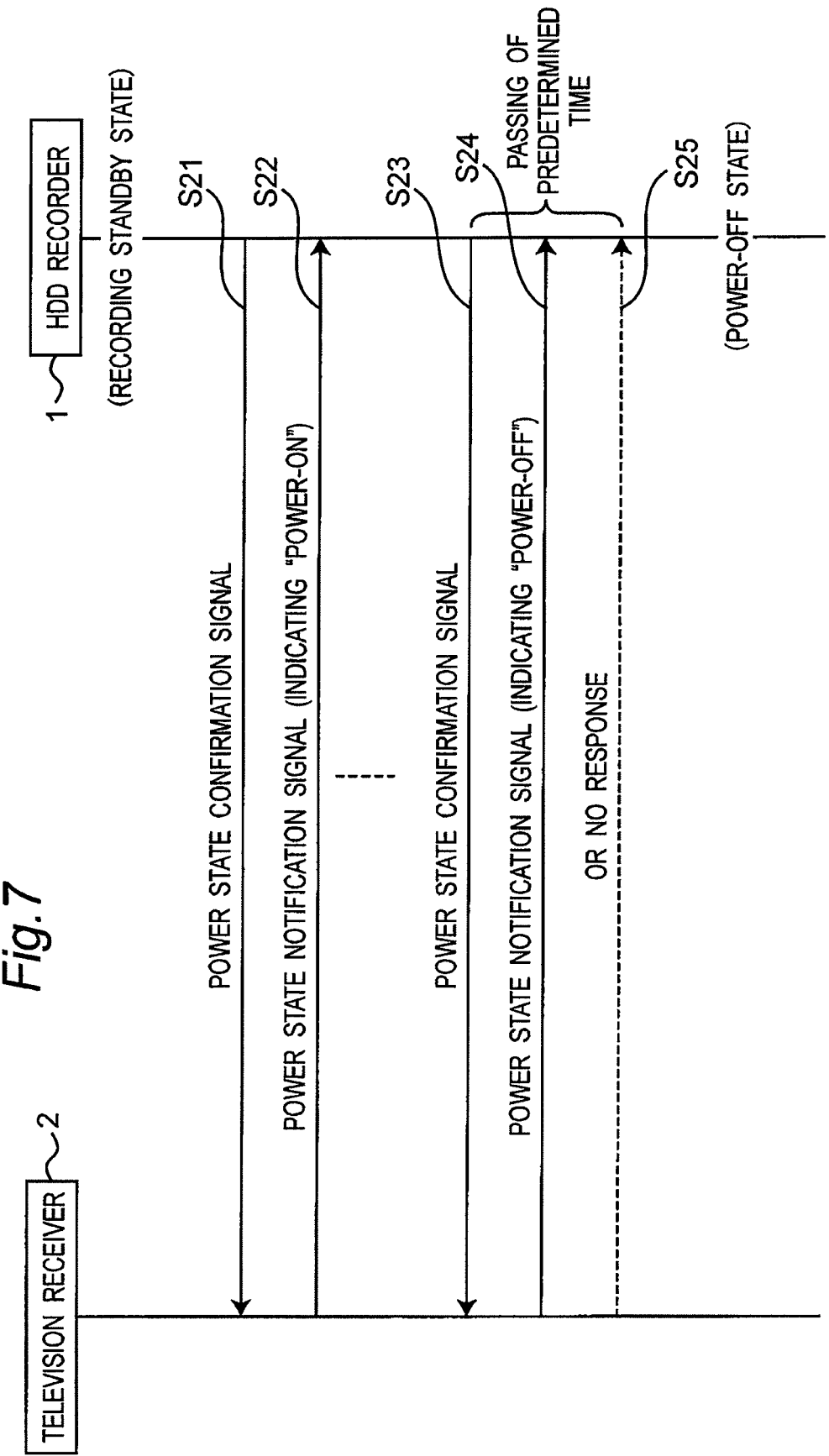

DATA PROCESSING DEVICE AND POWER CONTROL METHOD

TECHNICAL FIELD

The present invention relates to a data processing device capable of recording video and/or audio data to a recording medium such as an optical disk and a hard disk device (HDD), and more particularly, to a data processing device connected to a display device via a communication interface such as HDMI and IEEE 1394 and capable of being remotely operated by a control signal transmitted from the display device.

BACKGROUND ART

Conventionally, a system has been suggested, wherein the system connects a display device (for example, a television receiver) for receiving television broadcast to display video and a data processing device capable of recording television broadcast data via a communication interface, so that the data processing device can be remotely operated by a control signal transmitted from the display device.

For example, a recording/reproducing device described in patent document 1 is connected to a television receiver including a built-in set-top box and can be remotely operated by a control signal transmitted from the television receiver including the built-in set-top box. When this recording/reproducing device receives a power-on signal transmitted from the television receiver including the built-in set-top box while the power of the recording/reproducing device is off, the recording/reproducing device is turned on. Further, when the recording/reproducing device receives a timer program recording signal, the recording/reproducing device records received television broadcast data to a recording medium therein. It should be noted that, while the recording/reproducing device is off, this recording/reproducing device does not supply electric power to an input/output unit, a signal processing unit, a recording unit, and a control unit but continues to supply electric power to a unit for detecting whether there is any control signal. When the recording/reproducing device receives the power-on signal transmitted from the television receiver including the built-in set-top box, the recording/reproducing device begins to supply electric power to the input/output unit, the signal processing unit, the recording unit, and the control unit. Not only the remote operation during power-off but also power saving are achieved by the configuration as described above.

Patent document 1 also discloses a timer recording registration method with the television receiver including the built-in set-top box. The method suggested can be applied to a case where the television receiver including the built-in set-top box transmits a recording start signal to the recording/reproducing device.

Generally, a hard disk device (hereinafter referred to as "HDD") needs to perform spin-up from the stopped state until a recordable state, and it takes time to complete spin-up. Especially, when the HDD is activated at the power-off state (a state where no electric power is supplied), it takes more time to complete the spin-up (for example about 8 to 20 minutes).
Patent Document 1: Japanese Patent Laid-Open No. 2004-349790
Patent Document 2: Japanese Patent Laid-Open No. 2006-209941

DISCLOSURE OF INVENTION

Problems to be Solved by the Invention

In a case where an HDD is used as the recording medium of the recording unit, the recording/reproducing device described in patent document 1 has a problem in that the recording/reproducing device cannot immediately start recording when the television receiver including the built-in set-top box transmits a recording start signal upon a user's operation on the television receiver including the built-in set-top box to start recording a program which the user is currently viewing on the television receiver including the built-in set-top box while the recording/reproducing device is turned off. This is because it takes more time for the HDD to perform spin-up in a case where the HDD is activated at the power-off state as described above.

Always keeping the HDD in a ready-to-record state by supplying electric power to the recording unit during a power-off state can be considered as a method for solving this problem. However, this method cannot achieve power saving, because the HDD consumes much power.

As another method for solving the above problem, patent document 2 describes a method for a data processing device including a data buffer that temporarily stores data until the HDD completes the spin-up, wherein the data stored in the data buffer is written to the HDD after the HDD completes the spin-up. However, this method requires the data buffer to be additionally arranged, which makes its structure more complicated and increases the production cost.

The present invention is made in order to solve the above problems, and an object thereof is to provide a data processing device having a simple structure to allow a user to immediately start recording a program which the user is currently viewing and further achieve power saving.

Means for Solving the Problems

In the present invention, a data processing device has three power states including a power-off state, a recording standby state, and a power-on state, and when a data processing device detects, in the power-off state, that a display device externally connected is turned on, the data processing device changes from the power-off state to the recording standby state, so that the above problems are solved.

The data processing device according to the present invention includes a receiving unit operable to receive a control signal from a display device externally connected, a signal processing unit operable to generate video data and/or audio data, a drive unit data store the data generated by the signal processing unit to a recording medium, a signal output unit data output a video signal and/or audio signal, a control unit operable to control operation of the signal processing unit, the drive unit, and the signal output unit, and a power control unit operable to control electric power supplied to the signal processing unit, the drive unit, the signal output unit, and the control unit.

The power control unit can control supplying of the electric power in three power states including at least a power-off state, a recording standby state, a power-on state. The power control unit stops the supplying of the electric power to at least the drive unit in the power-off state, supplies to at least the drive unit and the control unit in the recording standby state, and supplies to the signal processing unit, the drive unit, the signal output unit, and the control unit in the power-on state. The signal output unit stops outputting of the video signal and/or audio signal in the power-off state and the recording standby state, and outputs the video signal and/or audio signal in the power-on state. The power control unit switches the power state from the power-off state to the recording standby state when the receiving unit receives a signal indicating that the display device is turned on, in the power-off state. The power control unit switches the power state from the recording standby state to the power-on state when the receiving unit receives a signal instructing start of a recording operation or a power state confirmation signal inquiring the power state of the data processing device from the display device, in the recording standby state.

A power control method according to the present invention is a power control method for the data processing device. The data processing device includes a receiving unit operable to receive a control signal from a display device externally connected, a signal processing unit operable to generate video data and/or audio data, a drive unit operable to store the data generated by the signal processing unit to a recording medium, a signal output unit operable to output a video signal and/or audio signal, a control unit signal control operation of the signal processing unit, the drive unit, and the signal output unit.

According to the power control method, supplying of the electric power is controlled in three power states including at least a power-off state, a recording standby state, a power-on state. That is, supplying of the electric power to at least the drive unit is stopped in the power-off state, the electric power is supplied to at least the drive unit and the control unit in the recording standby state, and the electric power is supplied to the signal processing unit, the drive unit, the signal output unit, and the control unit in the power-on state, and wherein the signal output unit stops outputting of the video signal and/or audio signal in the power-off state and the recording standby state, and outputs the video signal and/or audio signal in the power-on state. The power state is switched from the power-off state to the recording standby state when the receiving unit receives, in the power-off state, a signal indicating that the display device is turned on. The power state of the data processing device is switched from the recording standby state to the power-on state when the receiving unit receives a signal instructing start of recording or a power state confirmation signal inquiring the power state of the data processing device from the display device, in the recording standby state.

Advantages of the Invention

According to the present invention, the three power states, i.e., the power-off state, the recording standby state, and the power-on state, are switched. During the power-off state, the electric power supplied to at least the drive unit is stopped, so that power saving is achieved. During the recording standby state, the drive unit and the control unit are ready to operate, and therefore, it takes less time for the drive unit to perform spin-up when a recording start signal is received from the display device, and a time required to start actually the recording when a user status operation can be shortened. According to the present invention, the three power states are appropriately switched, and therefore, a data processing device having a simple structure and achieving power saving and a swift recording start processing upon activating the data processing device can be realized.

BRIEF DESCRIPTION OF DRAWINGS

FIG. 2 is a figure illustrating a display on a front panel unit and a state of electric power supplied to a control unit, a signal output unit, and a drive unit (HDD) in each of power states of an HDD recorder.

FIG. 7 is a communication sequence diagram when the HDD recorder switches the power state based on a power state notification signal received from the television receiver while the HDD recorder is in the recording standby state.

DESCRIPTION OF SYMBOLS

Figure 1:
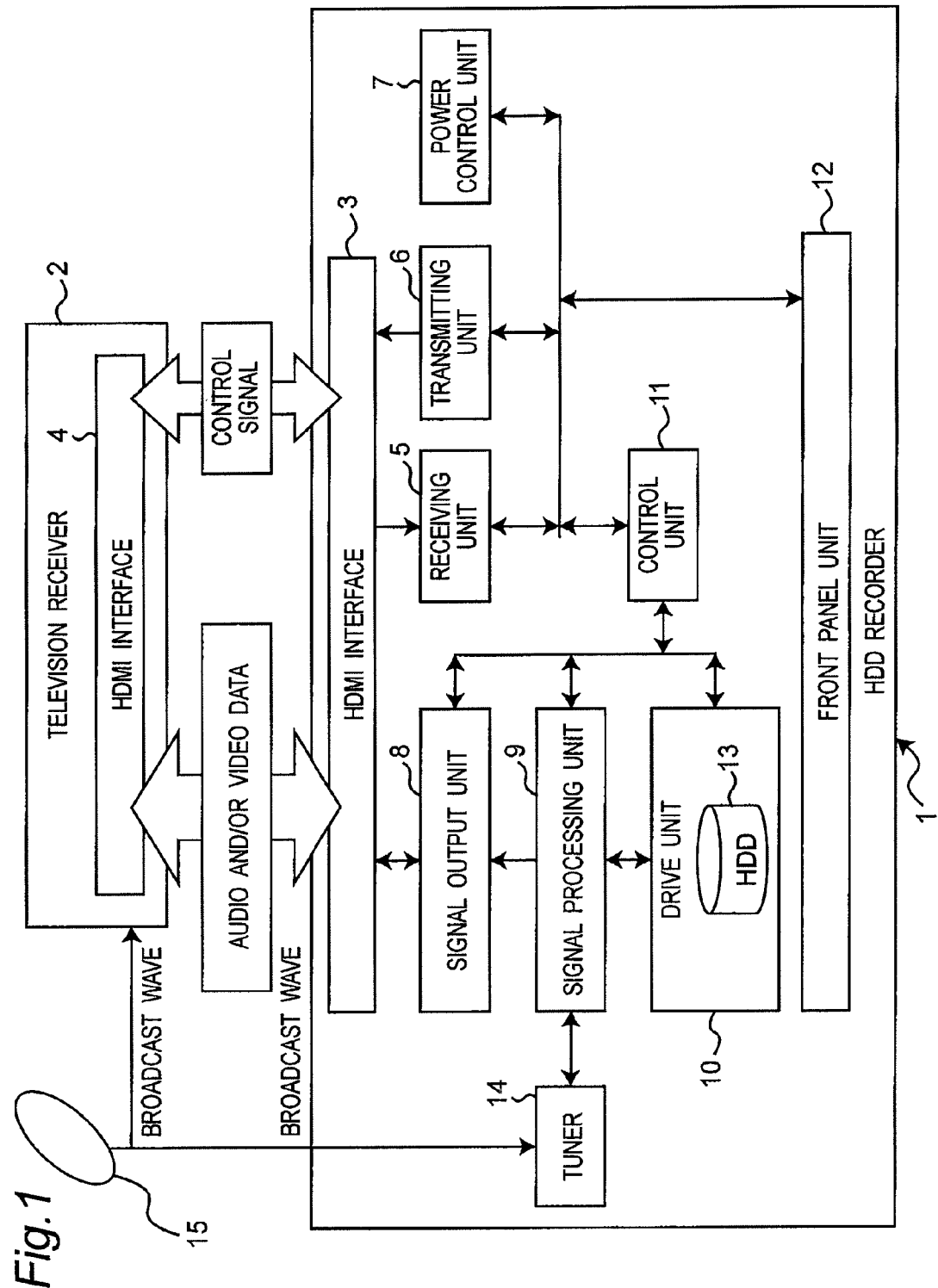
FIG. 1 is a block diagram showing a system including a data processing device and a television receiver according to an embodiment of the present invention.

1 HDD recorder (data processing device)
2 Television receiver (display device)
3 HDMI interface (HDD recorder)
4 HDMI interface (television receiver)
5 Receiving unit
6 Transmitting unit
7 Power control unit
8 Signal output unit
9 Signal processing unit
10 Drive unit
11 Control unit
12 Front panel unit
13 HDD
14 Tuner
15 Antenna

BEST MODE FOR CARRYING OUT THE INVENTION

Hereinafter, an embodiment according to the present invention will be described with reference to attached drawings.

1. System Configuration and Operation

FIG. 1 shows a configuration of a system including a television receiver and an HDD recorder serving as an embodiment of a data processing device according to the present invention. In FIG. 1, the HDD recorder 1 (data processing device) and the television receiver 2 (display device) are connected via HDMI (High-Definition Multimedia Interface). The HDD recorder 1 includes an HDMI Interface 3, a receiving unit 5, a transmitting unit 6, a power control unit 7, a signal output unit 8, a signal processing unit 9, a drive unit 10, a control unit 11, a front panel unit 12, an HDD 13, and a tuner 14. The control unit 11 executes a predetermined program to control operation of the HDD recorder 1. The television receiver 2 has an HDMI interface 4. Both the HDD recorder 1 and the television receiver 2 receive a broadcast wave signal via an antenna 15.

The HDD recorder 1 has a function of converting the received broadcast wave signal into video and/or audio data, and recording the data to the HDD 13 of the drive unit 10. The tuner 14 transmits the received broadcast wave signal to the signal processing unit 9. The signal processing unit 9 converts the broadcast wave signal into the video and/or audio data, and outputs the video and/or audio data to the signal output unit 8. The signal output unit 8 transmits the input video and/or audio data to the television receiver 2 via the HDMI interface 3. The television receiver 2 displays and outputs the video and/or audio data input via the HDMI interface 4.

When a user operates the HDD recorder 1 to instruct the HDD recorder 1 to change the channel, the control unit 11 instructs the tuner 14 to tune in the channel specified by the user. When the user operates the HDD recorder 1 to instruct the HDD recorder 1 to record a program currently received, the control unit instructs the signal processing unit 9 to output the video and/or audio data to the drive unit 10, and the drive unit 10 records the video and/or audio data to the HDD 13. Thereafter, the drive unit 10 continues to record the video and/or audio data until stop of recording is instructed by user's operation.

The HDD recorder 1 according to the present embodiment can be remotely operated by a control signal by receiving the control signal from the television receiver 2. The receiving unit 5 receives the control signal from the television receiver 2 via the HDMI interface 3, and notifies the control unit 11 of the control signal. The control unit 11 operates based on the control signal, and therefore, the HDD recorder 1 can be remotely operated by the television receiver 2. The transmitting unit 6 transmits the control signal to the television receiver 2 via the HDMI interface 3. It should be noted that no electric power needs to be supplied to the HDMI interface 3 in the transmission of the control signal between the HDD recorder 1 and the television receiver 2.

2. Power State of HDD Recorder

The power state of the HDD recorder 1 will be hereinafter described. The HDD recorder 1 is driven by an AC power source, and has three power states, i.e., "Power-on state", "Power-off state", and "Recording standby state". These power states are switched by the power control unit 7. The electric power is supplied to different processing units in accordance with the power state. Regardless of the power state of the HDD recorder 1, the electric power is always supplied to the power control unit 7 and the front panel unit 12. The power control unit 7 controls the supply of the electric power to the other processing units. The front panel unit 12 always displays a display indicating the power state of the HDD recorder 1. Hereinafter, control in each of the power states will be described.

2.1 Control in Each of the Power-On States (1) Control in the Power-On State

When the HDD recorder 1 is in "Power-on state", the power control unit 7 supplies the electric power to all processing units, i.e., the HDMI interface 3, the receiving unit 5, the transmitting unit 6, the signal output unit 8, the signal processing unit 9, the drive unit 10, the control unit 11, the HDD 13, and the tuner 14. In this power-on state, the HDD recorder 1 can perform all of the functions. In the power-on state, the front panel unit displays "power-on".

(2) Control in the Power-Off State

When the HDD recorder is in "Power-off state", the power control unit 7 supplies the electric power only to the receiving unit 5, the transmitting unit 6, and the control unit 11. In this power-off state, the HDD recorder 1 cannot receive any user operation other than "power-on", but the HDD recorder 1 can be remotely operated by the television receiver 2 due to the supply of the electric power to the receiving unit 5 and the transmitting unit 6. For the user using the HDD recorder 1 by remotely operating the HDD recorder 1 from the television receiver 2, it is not necessary to always keep the HDD recorder 1 in the power-on state. The HDD recorder 1 achieves power saving by enabling the remote operation in the power-off state. Further, by supplying continuously the electric power to the control unit 11 in the power-off state, software on the control unit 11 can be activated in a shorter time, and as a result, the entire HDD recorder 1 can start in a shorter time. If this acceleration of starting is not necessary, it is not necessary to supply the electric power to the control unit 11. In the power-off state, the front panel unit 12 displays "power-off".

(3) Control in the Recording Standby State

During the recording standby state of the HDD recorder 1, the power control unit 7 supplies the electric power to all elements, i.e., the HDMI interface 3, the receiving unit 5, the transmitting unit 6, the signal output unit 8, the signal processing unit 9, the drive unit 10, the control unit 11, the HDD 13, and the tuner 14. In this case, however, the signal output unit 8 halts the output of the video and/or audio data. The front panel unit 12 displays "power-off". Therefore, the power-off state and the recording standby state do not appear to be different to the user, and the user does not mind the difference between the power-off state and the recording standby state. During the recording standby state, the power control unit 7 may supply the electric power-only to at least the drive unit 10 and the control unit 11. This is because, if the drive unit 10 is supplied with the electric power and is ready to operate, it takes less time to perform spin-up when the drive unit 10 is activated. Further, this is because the control unit 11 receives various control signals from the television receiver 2 and therefore it is necessary for the control unit 11 to be supplied with the electric power to be ready to be activated.

More electric power is consumed in the recording standby state than in the power-off state by the electric power supplied to the HDMI interface 3, the signal output unit 8, the signal processing unit 9, the drive unit 10, the HDD 13, and the tuner 14. However, in the recording standby state, the electric power is supplied to the HDD 13, and accordingly, the drive unit 10 has already finished spin-up of the HDD 13 and is ready to be activated, and therefore, it takes less time to perform an activating processing of the entire HDD recorder 1.

It should be noted that FIG. 2 shows the relation of supply of the electric power to the control unit 11 and the drive unit 10 (including the HDD 13), out of the video and/or audio data is output, and a display content on the front panel unit 12, in each of the power states of the HDD recorder 1.

2.2 Transition Among the Power States

Figure 3:
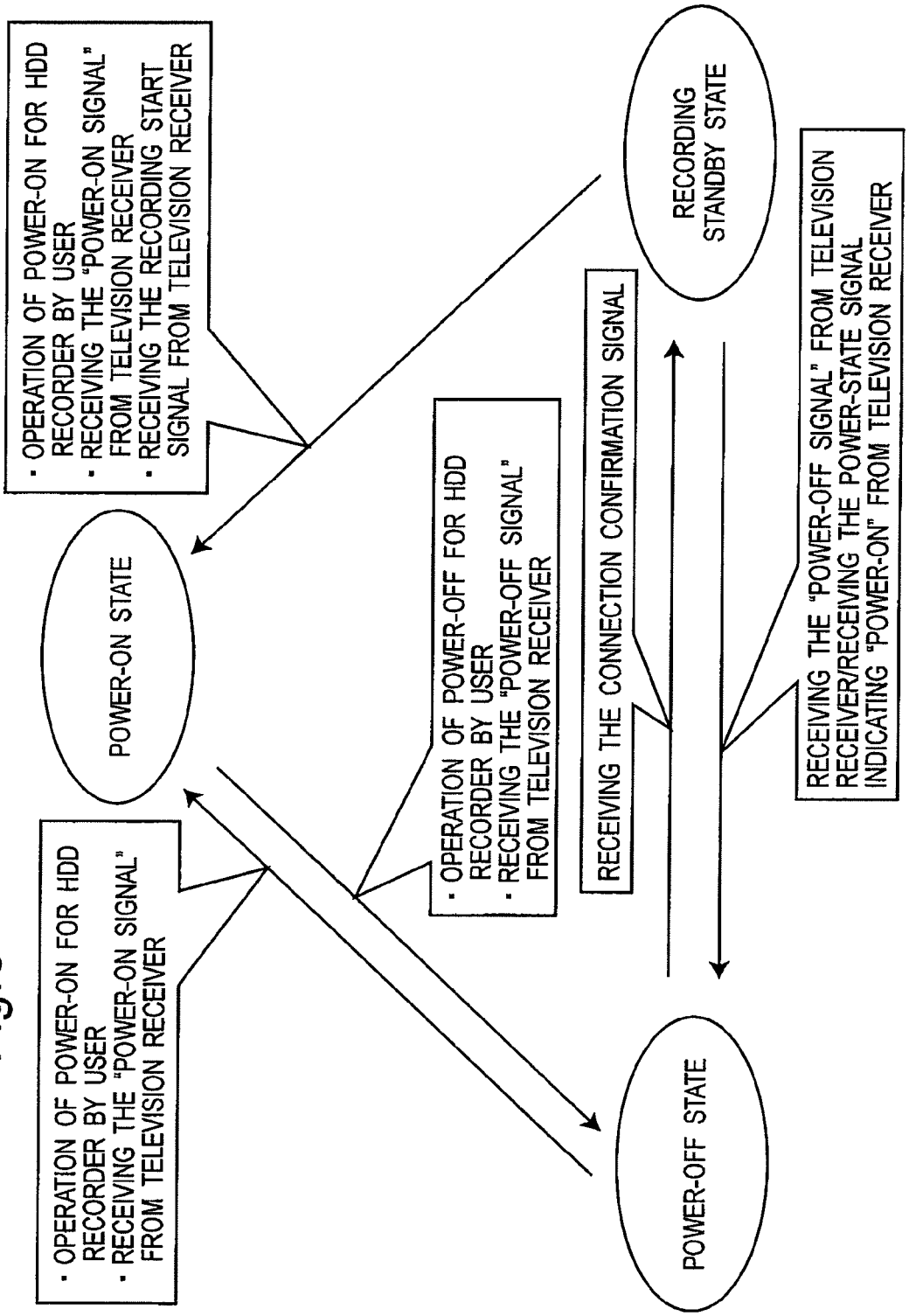
FIG. 3 is a transition diagram of the power states of the HDD recorder.

The transition among the three power states of the HDD recorder 1 will be described with reference to FIG. 3.

(1) Transition From the Power-Off State to the Recording Standby State

When the HDD recorder 1 detects that the television receiver 2 is turned on, in the power-off state, the HDD recorder 1 changes from the power-off state to the recording standby state. For example, when the television receiver 2 is turned on, the television receiver 2 transmits a connection confirmation signal to the HDD recorder 1. The HDD recorder 1 detects that the television receiver 2 is turned on when receiving the connection confirmation signal. It should be noted that the HDD recorder 1 can detect whether the television receiver 2 is turned on, not only by detecting the connection confirmation signal but also by detecting whether the HDD recorder 1 receives a predetermined signal that may be output from the television receiver 2.

(2) Transition From the Recording Standby State to the Power-Off State

When the HDD recorder 1 detects that the television receiver 2 is turned off in the recording standby state, the HDD recorder 1 changes to the power-off state. When the television receiver 2 is turned off, the television receiver 2 transmits a power-off signal. The HDD recorder 1 detects that the television receiver 2 is turned off when receiving the power-off signal. Alternatively, the HDD recorder 1 may periodically transmit a power state confirmation signal to the television receiver 2 in the recording standby state, and the HDD recorder 1 may change to the power-off state based on a response thereto. In particular, the HDD recorder 1 receives a power state notification signal from the television receiver 2 in reply to the power state confirmation signal. In a case where the power state notification signal received from the television receiver 2 indicates "Power-off", the HDD recorder 1 recognizes that the television receiver 2 is turned off, and the HDD recorder 1 changes from the recording standby state to the power-off state. In a case where the HDD recorder 1 cannot receive the power state notification signal from the television receiver 2 in reply to the power state confirmation signal in the recording standby state, the HDD recorder 1 recognizes that the remote operation function via the HDMI is invalidated, and in a case where the HDD recorder 1 fails to transmit the power state confirmation signal, the HDD recorder 1 recognizes that the connection with the television receiver 2 via the HDMI is disconnected, and then the HDD recorder 1 changes from the recording standby state to the power-off state. The details of this sequence will be described later.

(3) Transition From the Recording Standby State to the Power-On State

When the control unit 11 receives an instruction to turn on the HDD recorder 1 provided by the user on the front panel unit 12 (or a remote controller) in the recording standby state, the HDD recorder 1 changes from the recording standby state to the power-on state. When the HDD recorder 1 receives "Power-on signal", i.e., a signal (command) for turning on the HDD recorder 1 via remote operation, or "Recording start signal", i.e., a signal for instructing the HDD recorder 1 to start recording operation from the television receiver 2, in the recording standby state, the HDD recorder 1 changes to the power-on state. When the HDD recorder 1 receives "Power state confirmation signal", i.e., a signal for inquiring the power state of the HDD recorder 1 from the television receiver 2, in the recording standby state, HDD recorder 1 may change to the power-on state.

In this way, the HDD recorder 1 changes to the recording standby state only while the user views the television receiver 2. Therefore, it takes less time to start recording while power saving is achieved.

(4) Transition From the Power-Off State to the Power-On State

The HDD recorder 1 changes from the power-off state to the power-on state in the following cases. When the control unit 11 receives an instruction to turn on the HDD recorder 1 provided by the user on the front panel unit 12 (or the remote controller), in the power-off state, the HDD recorder 1 changes from the power-off state to the power-on state. When the HDD recorder 1 receives "Power-on signal" for turning on the HDD recorder 1 via remote operation from the television receiver 2, in the power-off state, the HDD recorder 1 changes to the power-on state.

(5) Transition From the Power-On State to the Power-Off State

The HDD recorder 1 changes from the power-on state to the power-off state in the following cases. When the control unit receives, in the power-on state, an instruction to turn off the HDD recorder 1 provided by the user on the front panel unit 12 (or the remote controller), the HDD recorder 1 changes from the power-off state to the power-on state. When the HDD recorder 1 receives, in the power-off state, from the television receiver 2 "Power-off signal" for turning off the HDD recorder 1 via remote operation from the television receiver 2, in the power-off state, the HDD recorder 1 changes to the power-off state.

2.3 Operation in Each of the Power States

The television receiver 2 has a function of converting the received broadcast wave signal into the video and/or audio data to and display the video and/or audio data. The user can view a broadcast program using the television receiver 2. The television receiver 2 transmits the control signal to the HDD recorder 1 via the HDMI interface 4 to allow the HDD recorder 1 to immediately start recording program data being displayed on the television receiver 2. At this moment, the communication sequence between the HDD recorder 1 and the television receiver 2 differs according to the power state of the HDD recorder 1. The communication sequence will be hereinafter described.

(1) In a Case Where the HDD Recorder is in the Power-On State

Figure 4:
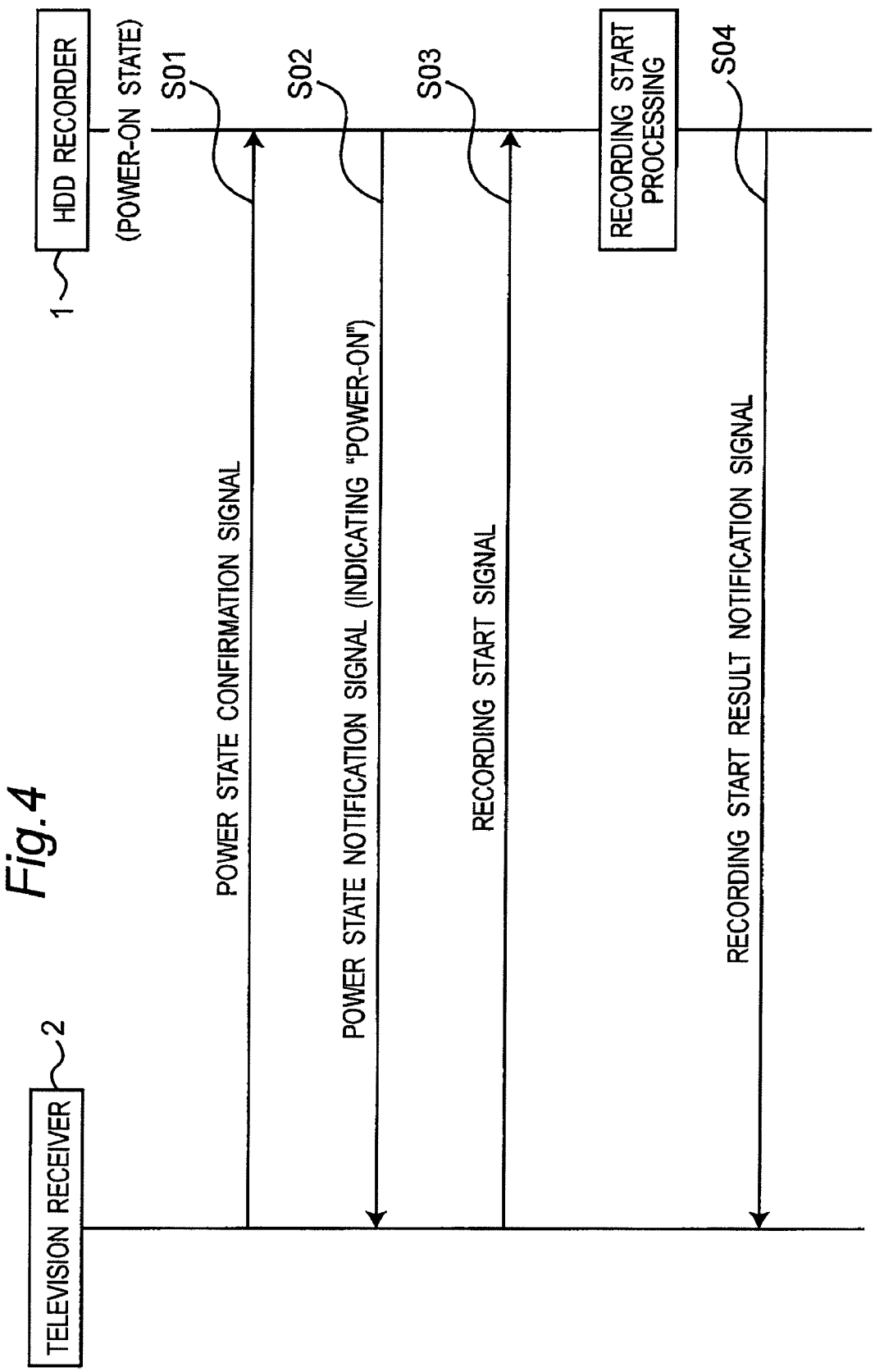
FIG. 4 is a communication sequence diagram when the television receiver instructs the HDD recorder to start recording while the HDD recorder is in a power-on state.

A processing for starting recording a program being viewed on the television receiver 2 while the HDD recorder 1 is in the power-on state will be described. FIG. 4 shows a communication sequence in this occasion.

When the user operates the television receiver 2 to instruct the HDD recorder 1 to record the program being displayed, the television receiver 2 transmits to the HDD recorder 1 the power state confirmation signal for inquiring the power state of the HDD recorder 1 (S01). The receiving unit 5 receives the power state confirmation signal and notifies the control unit 11 of the power state confirmation signal. The control unit 11 confirms the power state of the HDD recorder 1 and notifies the transmitting unit 6 of the confirmation result. In this case, the HDD recorder 1 is in the power-on state, and accordingly, the transmitting unit 6 transmits to the television receiver 2 the power state notification signal indicating "Power-on" (S02). The television receiver 2 which received the power state notification signal (power-on) recognizes that the HDD recorder 1 is in the power-on state. Thereafter, the television receiver 2 transmits a recording start signal to the HDD recorder 1 (S03). The receiving unit 5 which received the recording start signal notifies the control unit 11 of the recording start signal. The control unit 11 performs a tune-in processing to a channel specified by the recording start signal, and thereafter, starts a recording start processing. After the recording processing actually starts, the control unit 11 transmits a recording start result to the transmitting unit 6, and the transmitting unit 6 transmits a recording start result notification signal to the television receiver 2 (S04).

(2) In a Case Where the HDD Recorder is in the Power-Off State

Figure 5:
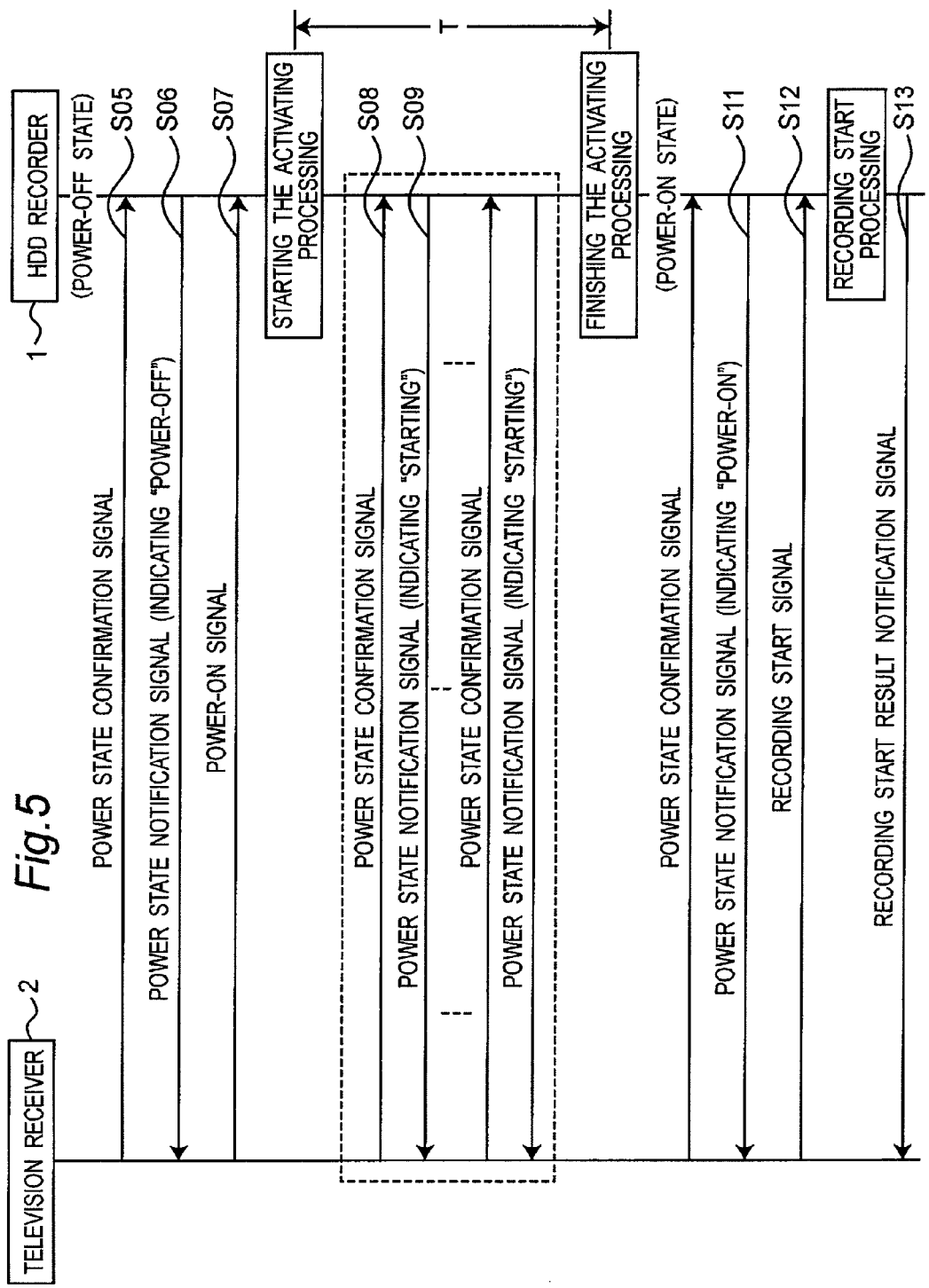
FIG. 5 is a communication sequence diagram when the television receiver instructs the HDD recorder to start recording while the HDD recorder is in a power-off state.

A processing for starting recording a program which a user is viewing on the television receiver 2 while the HDD recorder 1 is in the power-off state will be described. FIG. 5 shows a communication sequence in this occasion.

When the user operates the television receiver 2 to instruct the HDD recorder 1 to record the program being displayed, the television receiver 2 transmits to the HDD recorder 1 the power state confirmation signal (S05). The receiving unit 5 receives the power state confirmation signal and notifies the control unit 11 of the power state confirmation signal. The control unit 11 confirms the power state of the HDD recorder 1 and notifies the transmitting unit 6 of the confirmation result. In this case, the HDD recorder 1 is in the power-off state, and accordingly, the transmitting unit 6 transmits the power state notification signal indicating "Power off" to the television receiver 2 (S06). The television receiver 2 receiving the power state notification signal (power-off) recognizes that the HDD recorder 1 is in the power-off state, and the television receiver 2 transmits to the HDD recorder 1 "Power-on signal", i.e., a control signal for turning on the HDD recorder 1 (S07). When the HDD recorder 1 receives the power-on signal, the HDD recorder 1 starts the activating processing. Namely, the power control unit 7 starts the supplying of the electric power to the HDMI interface 3, the signal output unit 8, the signal processing unit 9, the drive unit 10, the HDD 13, and the tuner 14. After the television receiver 2 transmits the power-on signal, the television receiver 2 transmits a power state confirmation signal to the HDD recorder 1 (S08). The HDD recorder 1 replies a power state notification signal indicating "starting" in reply to the power state confirmation signal from a time which the activating processing starts to a time which the activating processing finishes (S09). The television receiver 2 periodically transmits the power state confirmation signal to the HDD recorder 1 until the television receiver 2 receives from the HDD recorder 1 the power state notification signal indicating "Power-on".

When the HDD recorder 1 finishes the activating processing of the HDD recorder 1, the HDD recorder 1 replies the power state notification signal indicating "Power-on" in reply to the power state confirmation signal transmitted from the television receiver 2 (S11). Thereafter, the television receiver 2 transmits the recording start signal to the HDD recorder 1 (S12). When the receiving unit 5 receives the recording start signal, the receiving unit 5 notifies the control unit 11 of the recording start signal. After the control unit 11 performs a tune-in processing to a channel specified by the recording start signal, the control unit 11 starts the recording start processing. After the recording processing actually starts, the control unit 11 notifies the transmitting unit 6 of the recording start result, and the transmitting unit 6 transmits the recording start result notification signal to the television receiver 2 (S13).

As described above, in a case where the HDD recorder 1 is in the power-off state, the television receiver 2 transmits the power-on signal, and the HDD recorder 1 receives the power-on signal starts the activating processing. At this moment, the power control unit 7 starts the supplying of the electric power to the HDMI interface 3, the signal output unit 8, the signal processing unit 9, the drive unit 10, the HDD 13, and the tuner 14, and the activating processing starts in each of the processing units. The activating processing of the entire HDD recorder 1 finishes after all of the processing units finishes the activating processing. It takes about 8 to 20 seconds for the HDD 13 to perform spin-up, and therefore, it takes especially a long time to perform the activating processing of the drive unit 10. As a result, there is a problem in that, even if the user operates the television receiver 2 to immediately record a program which the user is viewing on the television receiver 2, the first about 8 to 20 seconds cannot be actually recorded.

Considering the above, the present embodiment is arranged with the recording standby state in addition the power-on state and the power-off state as the power states of the HDD recorder 1 as described above. Next, operation in a case where the HDD recorder 1 is in the recording standby state will be described.

Figure 6:
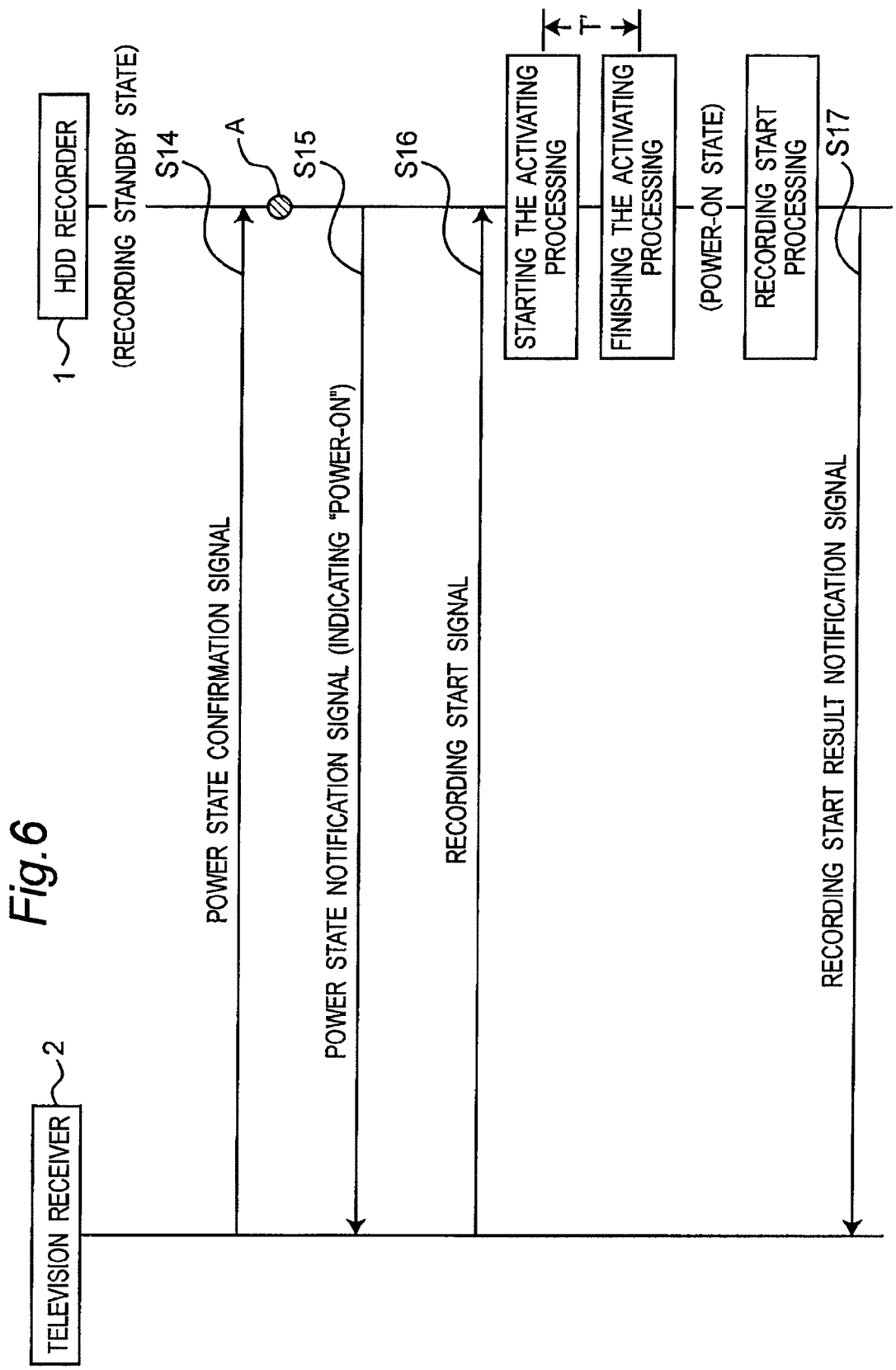
FIG. 6 is a communication sequence diagram when the television receiver instructs the HDD recorder to start recording while the HDD recorder is in a recording waiting state.

(3) In a Case Where the HDD Recorder is in the Recording Standby State 3-1) Processing When a Recording Start Request is Received From the Television Receiver A processing for starting recording a program which a user is viewing on the television receiver 2 while the HDD recorder 1 is in the recording standby state will be described. FIG. 6 shows a communication sequence in this occasion.

When the user operates the television receiver 2 to instruct the HDD recorder 1 to record the program being displayed, the television receiver 2 transmits to the HDD recorder 1 the power state confirmation signal (S14). The receiving unit 5 receives the power state confirmation signal and notifies the control unit 11 of the power state confirmation signal. The control unit 11 confirms the power state of the HDD recorder 1 and notifies the transmitting unit 6 of the confirmation result. In this case, the HDD recorder 1 is in the recording standby state, but for the sake of simplifying the communication sequence and making the overall processing faster, the transmission unit 6 transmits the power state notification signal indicating "Power-on" to the television receiver 2 (S15). The television receiver 2 which received the power state notification signal (power-on) recognizes that the HDD recorder 1 is in the power-on state. Thereafter, the television receiver 2 transmits the recording start signal to the HDD recorder 1 (S16). When the receiving unit 5 receives the recording start signal, the receiving unit 5 notifies the control unit 11 of the recording start signal, so that the activating processing of the HDD recorder 1 starts. At this moment, the drive unit 10 has already been supplied with the electric power and is ready to operate. Namely, it takes less time for the drive unit 10 to perform spin-up, and a time T' required to perform the activating processing at this occasion is less than a time T (see FIG. 5) required to start the HDD recorder 1 from the power-off state. When the activating processing finishes, the control unit 11 performs a tune-in processing to a channel specified by the recording start signal, and thereafter, the control unit 11 starts the recording start processing. After the recording processing actually starts, the control unit 11 notifies the transmitting unit 6 of the recording start result, and the transmitting unit 6 transmits the recording start result notification signal to the television receiver 2 (S17).

In the recording standby state (see S15), the HDD recorder 1 transmits the power state signal indicating "Power-on" in reply to the power state confirmation signal transmitted from the television receiver 2, but the HDD recorder 1 may transmit the power state signal indicating "Power-off". Further, the HDD recorder 1 may start the activating processing without waiting for the recording start signal when the HDD recorder 1 receives the power state confirmation signal transmitted from the television receiver 2 at first (at the time of A in FIG. 6).

3-2) Switching Processing of the Power State Based on the Power State Notification Signal Received From the Television Receiver Next, a switching processing of the power state when the television receiver 2 is turned off while the HDD recorder 1 is in the recording standby state will be described. FIG. 7 shows a communication sequence at this occasion.

The transmitting unit 6 of the HDD recorder 1 transmits to the television receiver 2 a power state confirmation signal for inquiring the power state of the television receiver 2 (S21). In reply to the power state confirmation signal, the television receiver 2 transmits to the HDD recorder 1 the power state notification signal for notifying about the power state of the television receiver 2 (S22). In S22, the television receiver 2 transmits the power state notification signal notifying that the television receiver 2 is "Power-on". When the receiving unit 5 of the HDD recorder 1 receives the power state notification signal from the television receiver 2, the receiving unit 5 notifies the control unit 11 of the power state notification signal. The control unit 11 recognizes that the television receiver 2 is turned on from the fact that the power state notification signal indicating "Power-on" is received, and notifies the power control unit 7 of the determination result.

The power control unit 7 receives the determination result and maintains the recording standby state. The HDD recorder 1 periodically transmits the power state confirmation signal to the television receiver 2.

When the television receiver 2 turned off, the television receiver 2 transmits the power state notification signal indicating "Power-off" to the HDD recorder 1 (S24) in reply to the power state confirmation signal transmitted by the HDD recorder 1 (S23). When the receiving unit 5 of the HDD recorder 1 receives the power state notification signal indicating "Power-off", the receiving unit 5 notifies the control unit 11 of the power state notification signal. The control unit 11 recognizes that the television receiver 2 is turned off from the fact that the power state notification signal indicating "Power-off" is received, and notifies the power control unit 7 of the determination result. The power control unit 7 receives the determination result, and switches the power state from the recording standby state to the power-off state. In a case where the supply of the electric power to the television receiver 2 is cut due to power failure and other failures, or in a case where the remote operation function of the television receiver 2 via the HDMI is invalidated, the television receiver 2 does not transmit the power state notification signal in reply to the power state confirmation signal. Therefore, when the control unit 11 of the HDD recorder 1 does not receive the power state notification signal from the television receiver 2 even after a predetermined time passes since the power state confirmation signal was last transmitted (S25), the control unit 11 recognizes that the television receiver 2 is turned off or that the television receiver 2 is not configured to remotely operate the HDD recorder 1, and notifies the power control unit 7 of the determination result. In a case where the HDD recorder 1 fails to transmit the power state confirmation signal, the control unit 11 recognizes that the connection with the television receiver 2 via the HDMI is disconnected, and notifies the power control unit 7 of the determination result. In these cases, the power control unit 7 also changes the power state from the recording standby state to the power-off state.

It should be noted that it is not necessary to set a special signal as the power state confirmation signal, and a signal always output to the HDD recorder 1 when the television receiver 2 is turned on may be monitored. In this case, the control unit 11 of the HDD recorder 1 can recognize that the television receiver 2 is turned on while the monitored signal is received, and can recognize that the television receiver 2 is turned off when the monitored signal can no longer be received.

3. Summary

As described above, the HDD recorder 1 according to the present embodiment is arranged with the three power states (power-on state/power-off state/recording standby state) as power supply states. In particular, the HDD recorder 1 is arranged with the recording standby state in which the HDD recorder 1 stops video/audio output to the television receiver 2 so that the HDD recorder 1 appears to be "Power-off" while the electric power is supplied to the control unit 11 and the drive unit 10 (HDD 13). In the recording standby state in which the control unit 11 is supplied with the electric power, the television receiver 2 can remotely operate the HDD recorder 1. In the recording standby state in which the drive unit 11 (HDD 13) is also supplied with the electric power, it takes less time for the drive unit 10 (HDD 13) to perform spin-up when the recording start signal is received from the television receiver 2, so that it takes less time to finish the activating processing. In the power-off state, at least the electric power supplied to the drive unit is stopped, and accordingly, power saving is achieved. Therefore, the power-off state and the recording standby state are appropriately switched in accordance with the usage situation of the HDD recorder 1 and the television receiver 2, so that the recording start processing upon activating the data processing device can be performed swiftly while power saving is achieved.

In the above description, the recording medium of the HDD recorder 1 is the HDD (hard disk device), but the recording medium may also be an optical disk such as a DVD (Digital Versatile Disk) and a BD (Blue-ray Disc).

Further, the control unit 11 may be divided into two control units, i.e., a control unit for controlling display on the front panel unit 12 and a control unit for controlling the units other than the front panel unit 12. In this case, in the power-off state, the electric power is preferably supplied to the control unit for controlling display on the front panel unit 12, and the electric power is preferably not supplied to the control unit for controlling the units other than the front panel unit 12.

INDUSTRIAL APPLICABILITY

In the present invention, when the data processing device including a recording medium therein such as an HDD that takes much time to be activated is remotely operated by a display device and the like, the data processing device can be activated in a shorter time and achieve power saving. Therefore, the present invention is effective for a data processing device such as an HDD recorder including a recording medium therein that takes much time to be activated.

The invention claimed is:

1. A data processing device operable to connect to a first display, and operate in a first power state including a power-off state, a recording standby state, and a power-on state, the data processing device comprising:
   a receiver operable to receive a control signal from the first display connected to the data processing device;
   a transmitter operable to transmit a power state inquiring signal to the first display;
   a driver operable to acquire data including at least one of a video signal and an audio signal, and store the data to a recording medium;
   a power controller operable to control electric power supplied to the data processing device; and
   a second display operable to display an operation state of the data processing device,
   wherein the power controller supplies the electric power to at least the driver in the power-on state and the recording standby state, and stops supplying the electric power to at least the driver in the power-off state,
   wherein the second display indicates that power is on in the power-on state, and indicates that the power is off in the recording standby state and the power-off state,
   wherein the power controller switches the first power state from the recording standby state to the power-on state when the receiver receives a signal instructing a start of a recording operation from the first display and the first power state is the recording standby state,
   wherein the transmitter periodically transmits, when the first power state is the recording standby state, the power state inquiring signal for inquiring a second power state of the first display, and
   wherein the power controller changes, when the first power state is the recording standby state, the first power state from the recording standby state to the power-off state when the receiver does not receive a power state confirmation signal from the first display within a predetermined time in reply to the power state inquiring signal.

2. The data processing device according to claim 1, wherein the power controller switches the first power state from the recording standby state to the power-on state when the receiver receives a second power state confirmation signal inquiring the first power state of the data processing device from the first display and the first power state is the recording standby state.

3. The data processing device according to claim 1, wherein the power controller switches the first power state from the power-off state to the recording standby state when the first display is turned on and the first power state is the power-off state.

4. The data processing device according to claim 1 further comprising:
  a signal output for outputting at least one of the video signal and the audio signal,
  wherein the power controller supplies the electric power to the signal output in the power-on state and the recording standby state, and stops supplying the electric power to the signal output in the power-off state.

5. The data processing device according to claim 2, wherein the second display displays that the power of the data processing device is off in the power-off state.

6. The data processing device according to claim 2, wherein the second display displays that the power of the data processing device is off in the recording standby state.

7. The data processing device according to claim 1, wherein, when the first power state is the recording standby state, the power controller changes the first power state from the recording standby state to the power-off state when the receiver receives the power state confirmation signal indicating that the second power state of the first display is off in reply to the power state inquiring signal.

8. The data processing device according to claim 1, wherein the power controller changes the first power state from the recording standby state to the power-off state when the receiver receives, from the first display, a second signal indicating that the first display is turned off and the first power state is the recording standby state.

9. The data processing device according to claim 1, wherein the power controller changes the first power state from the recording standby state to the power-on state when the receiver receives a second signal for turning on the data processing device from the first display and the first power state is the recording standby state.

10. The data processing device according to claim 1, wherein the power controller changes the first power state from the power-off state to the power-on state when the receiver receives a second signal for turning on the data processing device from the first display and the first power state is the power-off state.

11. The data processing device according to claim 3, wherein the receiver receives a second signal indicating that the first display is turned on.

12. The data processing device according to claim 1, wherein, when the first power state is the recording standby state, the power controller changes the first power state from the recording standby state to the power-off state when a transmission of the power state inquiring signal to the first display fails.

13. The data processing device according to claim 1, wherein the power state inquiring signal is transmitted in accordance with a predetermined standard.

14. The data processing device according to claim 7, wherein the power state confirmation signal is received in accordance with a predetermined standard.

15. The data processing device according to claim 1, wherein the receiver transmits a power state notification signal to the first display that indicates that the power is on when the first power state is the recording standby state.

16. The data processing device according to claim 1, wherein the power controller supplies the electric power in a same way when the first power state is the power-on state and when the first power state is the recording standby state.

17. The data processing device according to claim 1, wherein the power controller supplies the electric power to only the receiver, a controller, and a transmitter when the first power state is the power-off state.

18. A power control method for a data processing device, the data processing device capable of being connected to a first display and operating in a first power state including a power-off state, a recording standby state, and a power-on state, the data processing device comprising: a receiver operable to receive a control signal from the first display connected to the data processing device; a transmitter operable to transmit a power state inquiring signal to the first display; a driver operable to acquire data including at least one of a video signal and an audio signal, and store the data to a recording medium; a power controller operable to control electric power supplied to the data processing device; and a second display operable to display an operation state of the data processing device,
  the power control method comprising:
    supplying the electric power to at least the driver in the power-on state and the recording standby state, and stopping a supply of the electric power to at least the driver in the power-off state;
    displaying that power is on in the power-on state, and displaying that power is off in the recording standby state and the power-off state;
    switching the first power state from the recording standby state to the power-on state when the receiver receives a signal instructing a start of a recording operation from the first display and the first power state is the recording standby state;
    periodically transmitting, when the first power state is the recording standby state, the power state inquiring signal for inquiring a second power state of the first display; and
    changing, when the first power state is the recording standby state, the first power state from the recording standby state to the power-off state when the receiver does not receive a power state confirmation signal from the first display within a predetermined time in reply to the power state inquiring signal.

* * * * *